United States Patent
Simonazzi et al.

(10) Patent No.: US 11,984,256 B2
(45) Date of Patent: May 14, 2024

(54) WOUND COMPONENT

(71) Applicant: META SYSTEM S.p.A., Reggio Emilia (IT)

(72) Inventors: Giuseppe Simonazzi, Reggio Emilia (IT); Cesare Lasagni, Reggio Emilia (IT); Severino Bigliardi, Reggio Emilia (IT)

(73) Assignee: META SYSTEM S.p.A., Reggio Emilia (IT)

( * ) Notice: Subject to any disclaimer, the term of this patent is extended or adjusted under 35 U.S.C. 154(b) by 655 days.

(21) Appl. No.: 17/264,740

(22) PCT Filed: Jul. 26, 2019

(86) PCT No.: PCT/IB2019/056412
§ 371 (c)(1),
(2) Date: Jan. 29, 2021

(87) PCT Pub. No.: WO2020/026103
PCT Pub. Date: Feb. 6, 2020

(65) Prior Publication Data
US 2021/0304957 A1    Sep. 30, 2021

(30) Foreign Application Priority Data

Jul. 31, 2018  (IT) .................. 102018000007694

(51) Int. Cl.
*H01F 27/24*  (2006.01)
*H01C 7/02*  (2006.01)
(Continued)

(52) U.S. Cl.
CPC ............. *H01F 27/402* (2013.01); *H01C 7/02* (2013.01); *H01F 27/24* (2013.01); *H01F 27/28* (2013.01);
(Continued)

(58) Field of Classification Search
CPC ........ H01F 27/402; H01F 27/24; H01F 27/28; H01F 2027/406; H01C 7/02; H02J 7/0042
(Continued)

(56) References Cited

U.S. PATENT DOCUMENTS

2008/0212345 A1* 9/2008 Yamashita ................ H02J 7/04
                                                        363/50
2010/0213902 A1* 8/2010 Oliveira .................. H02J 7/342
                                                        320/145
(Continued)

FOREIGN PATENT DOCUMENTS

EP    1 441 374 A1    7/2004
EP    2 995 918 A1    3/2016
(Continued)

OTHER PUBLICATIONS

Ichikawa et al., WO Patent Document No. WO-2014125596-A1, published Aug. 21, 2014, front page including abstract and 1 drawing. (Year: 1014).*
(Continued)

*Primary Examiner* — Phallaka Kik
(74) *Attorney, Agent, or Firm* — ASLAN LAW, P.C.

(57) ABSTRACT

A wound component having a ferromagnetic support, at least one electrically conductive winding wound around the ferromagnetic support and adapted to conduct at least one induction current, and a temperature sensor interposed between the ferromagnetic support and the winding.

6 Claims, 2 Drawing Sheets

(51) Int. Cl.
*H01F 27/28* (2006.01)
*H01F 27/40* (2006.01)
*H02J 7/00* (2006.01)

(52) U.S. Cl.
CPC ...... *H02J 7/0042* (2013.01); *H01F 2027/406* (2013.01)

(58) Field of Classification Search
USPC ................ 320/109, 104, 108, 134, 144, 150
See application file for complete search history.

(56) References Cited

U.S. PATENT DOCUMENTS

| | | | | |
|---|---|---|---|---|
| 2014/0297206 | A1* | 10/2014 | Silverman | H02J 13/00034 702/58 |
| 2015/0035475 | A1* | 2/2015 | Li | H02J 7/00309 320/107 |
| 2015/0137926 | A1 | 5/2015 | Yoshikawa | |
| 2016/0069750 | A1* | 3/2016 | Annis | H01F 27/402 374/163 |
| 2016/0129520 | A1* | 5/2016 | Schwartz | H01F 38/085 219/130.1 |
| 2016/0144731 | A1* | 5/2016 | Park | B60L 53/00 320/109 |
| 2017/0151885 | A1* | 6/2017 | Kim | H02J 7/00712 |
| 2017/0184457 | A1 | 6/2017 | Maeno et al. | |
| 2017/0291499 | A1* | 10/2017 | Shin | B60L 58/10 |
| 2017/0307449 | A1* | 10/2017 | Bonifas | G01K 1/08 |
| 2017/0352476 | A1 | 12/2017 | Inaba et al. | |
| 2019/0067973 | A1* | 2/2019 | Yamada | H02J 7/00 |

FOREIGN PATENT DOCUMENTS

| | | | | |
|---|---|---|---|---|
| JP | 6098708 B2 | * | 3/2017 | ............. B60L 50/66 |
| JP | 2018026504 A | * | 2/2018 | |
| WO | WO 2016/073098 A1 | | 5/2016 | |
| WO | WO-2016073098 A1 | * | 5/2016 | ........... B23K 9/1006 |

OTHER PUBLICATIONS

Inaba et al., WO Patent Document No. WO-2016104246-A1, published Jun. 30, 2016, front page including abstract and 1 drawing. (Year: 2016).*

* cited by examiner

WOUND COMPONENT

CROSS-REFERENCE TO RELATED APPLICATIONS

This application claims priority to IT Patent Application No. 102018000007694 filed on Jul. 31, 2018, and to PCT Application No. PCT/IB2019/056412 filed on Jul. 26, 2019, the entire contents of which are hereby incorporated by reference.

TECHNICAL FIELD

The present invention relates to a wound component.

BACKGROUND ART

A plurality of wound components are known and are generally used for the manufacture of a wide variety of devices, such as transformers or resonant inductors.

In general, wound components of known type comprise at least one electrically conductive winding wound around a ferromagnetic support, which is commonly made of ferromagnetic material, such as e.g. ferrite.

In particular, the winding is adapted to be crossed by an induction current which generates a magnetic field, the field lines of which are confined inside the ferromagnetic support.

However, it is well known that the temperature of the wound components made this way need to be monitored.

This need is also particularly felt in the automotive sector, wherein, in particular in the production of electric motor vehicles, battery chargers that comprise such windings are widely used.

In fact, the winding and the ferromagnetic support frequently reach very high temperatures which can also damage the battery charger or even the wound component itself.

DESCRIPTION OF THE INVENTION

The main aim of the present invention is to devise a wound component that allows accurately measuring the temperature of the same.

Another object of present invention is to devise a wound component that allows overcoming the mentioned drawbacks of the prior art in a simple, rational, easy and effective to use and affordable solution.

The above objects are achieved by the present wound component having the characteristics of claim 1.

BRIEF DESCRIPTION OF THE DRAWINGS

Other characteristics and advantages of the present invention will be more evident from the description of some preferred, but not exclusive, embodiments of a wound component, illustrated as an indication, but not limited to, in the attached tables of drawings wherein.

EMBODIMENTS OF THE INVENTION

Figure 1:
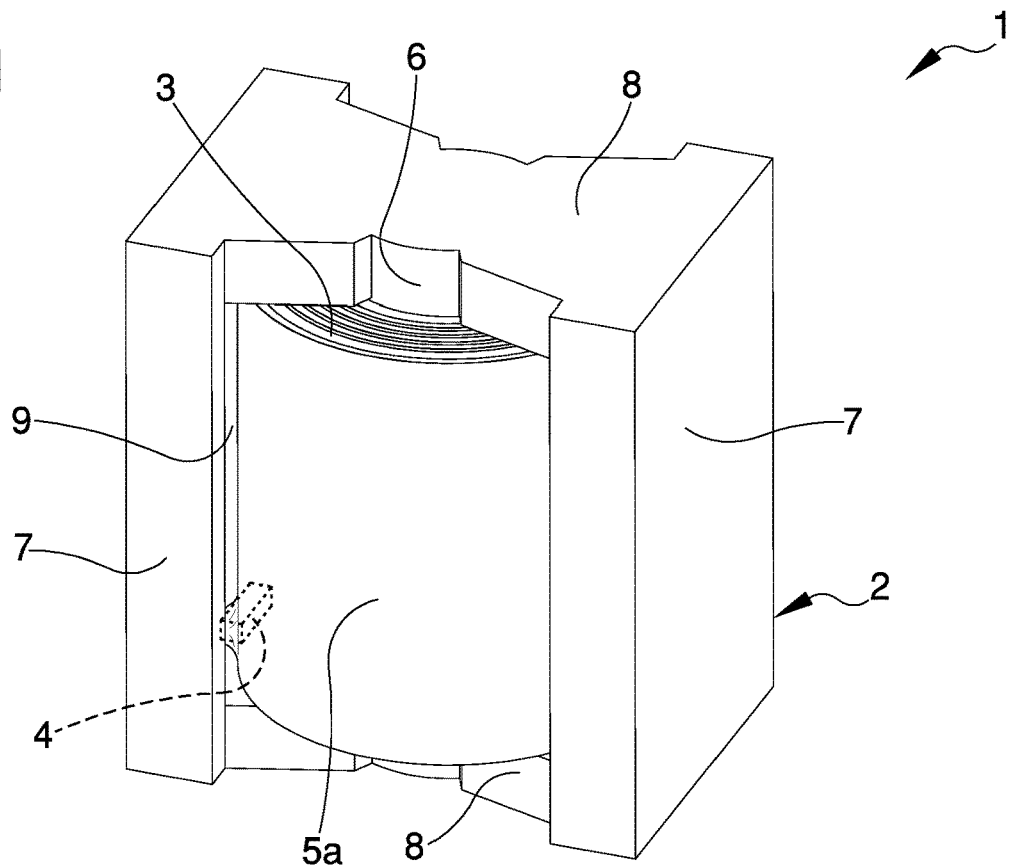
FIG. 1 is a schematic axonometric view of the wound component according to the invention.

With particular reference to these figures, reference numeral 1 globally indicates a wound component.

The wound component 1 comprises:
at least one ferromagnetic support 2;
at least one electrically conductive winding 3 wound around the ferromagnetic support 2 and adapted to conduct at least one induction current.

Figure 2:
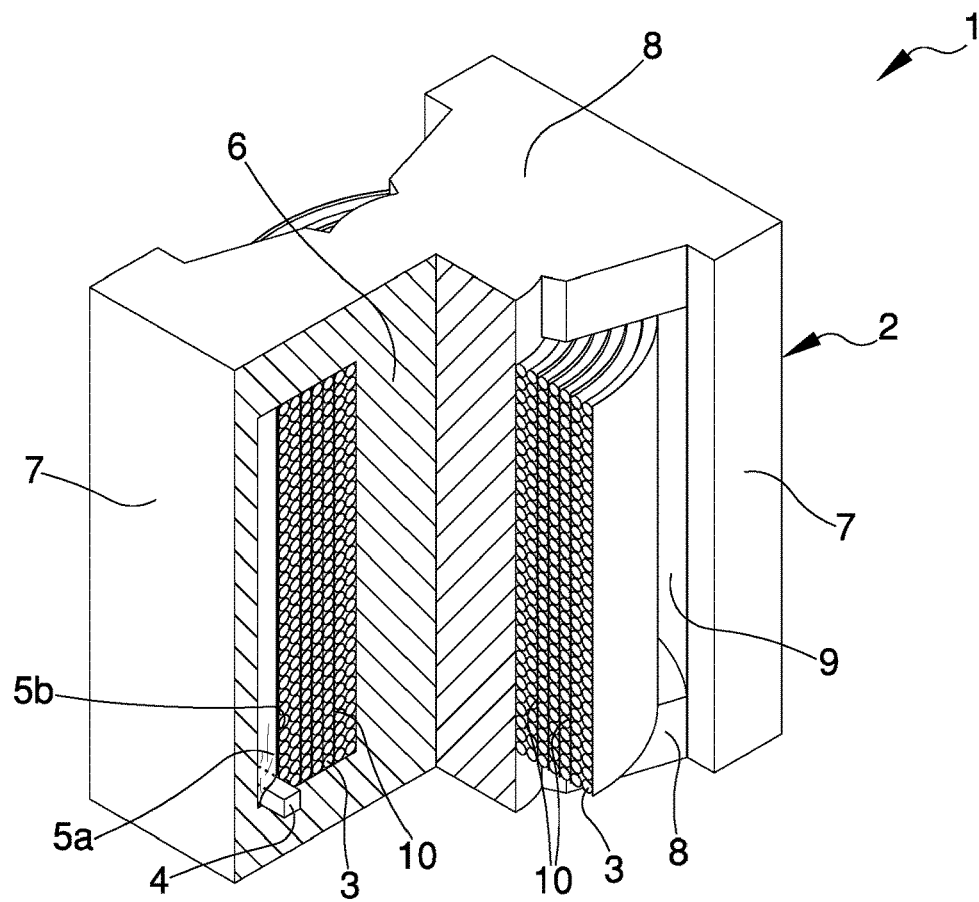
FIG. 2 is a schematic broken view of the wound component according to the invention.
Figure 3:
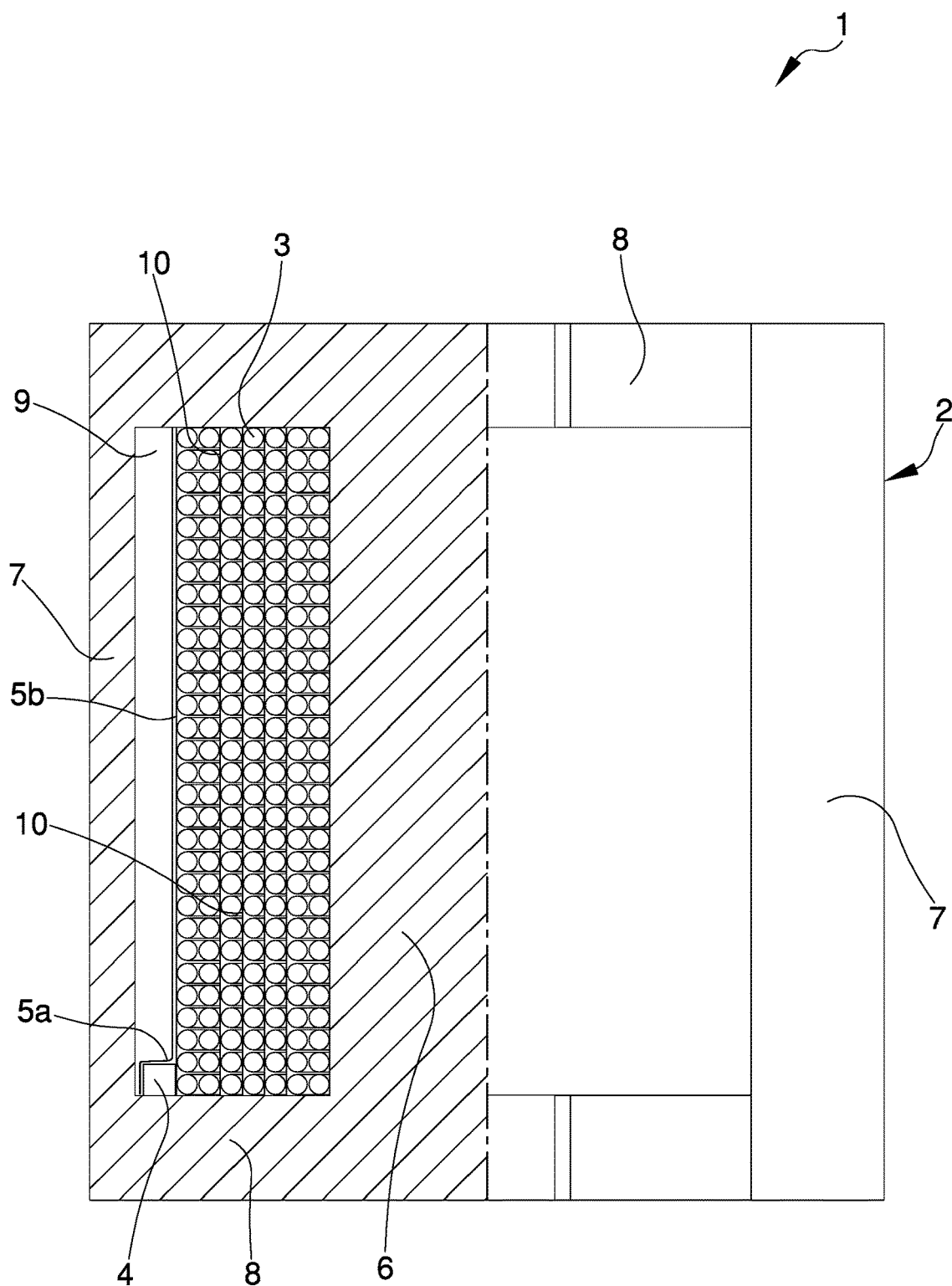
FIG. 3 is a schematic sectional view of the wound component according to the invention.

In the following treatise the term winding 3 is used to indicate an electrically conductive element, such as e.g. an electric wire, wound several times around at least part of the ferromagnetic support 2, so as to create a solenoid structure comprising one or more layers of winding 3 as shown in FIGS. 2 and 3.

Advantageously, the wound component 1 comprises at least one temperature sensor 4 interposed between the ferromagnetic support 2 and the winding 3.

In particular, the temperature sensor 4 is preferably connected to control means, not shown in the illustrations, which are configured to operate in conjunction with the latter in order to limit the induction current circulating in the winding 3 in the event of the temperature sensor 4 detecting a particularly high temperature, such as e.g. a higher temperature than a predefined safety temperature value.

Preferably, the temperature sensor 4 is provided with an external protective body and with a measuring body encapsulated inside the protective body.

In particular, the protective body is preferably a shielding body, e.g. made of metal material, adapted to shield the measuring body from the electromagnetic radiation emitted by the induction current circulating inside the winding 3.

In fact, these radiations induce, inside the temperature sensor 4, several induced eddy currents that interfere with the operation of the temperature sensor 4, for example by altering the temperature value measured by the sensor itself.

In fact, the temperature sensor 4 is preferably of the type of a thermistor, or resistive electronic element, the resistance value of which varies with the temperature reached by the temperature sensor itself.

For this reason, an induced eddy current circulating along the temperature sensor 4 inevitably affects the total current balance that varies the current.

In particular, the temperature sensor 4 is of the type of a Negative Temperature Coefficient (NTC) thermistor.

Alternative embodiments of the wound component 1 cannot however be ruled out wherein the temperature sensor 4 is of the type of a Positive Temperature Coefficient (PTC) thermistor.

Advantageously, the temperature sensor 4 is arranged equidistant from the ferromagnetic support 2 and from the winding 3.

This solution allows measuring the temperature of the wound component 1 equally taking into account the temperature of the winding 3 and of the ferromagnetic support 2.

In other words, the temperature sensor 4 arranged this way measures the temperature of both the winding 3 and of the ferromagnetic support 2.

In fact, the ferromagnetic support 2 and the winding 3 reach temperatures being significantly different from each other depending on the frequency of the induction current circulating in the winding 3.

Consequently, in a configuration wherein the temperature sensor 4 is arranged close to the ferromagnetic support 2 or to the winding 3, the temperature measured by the sensor itself may differ from the actual temperature of the wound component 1, i.e. it may measure a particularly low temperature in the proximity of the winding 3 while, on the contrary, the temperature of the wound component 1 may be significantly higher due to a high temperature of the ferromagnetic support 2.

Advantageously, the temperature sensor 4 is arranged in contact with the ferromagnetic support 2 and the winding 3.

In addition, the wound component 1 comprises at least a first electrically insulating element 5a interposed between the temperature sensor 4 and the winding 3.

Preferably, the electrically insulating element 5 is of the type of a tape wound around the winding 3 and on which the temperature sensor 4 is placed.

In particular, the electrically insulating element 5 is adapted to galvanically uncouple the winding from the temperature sensor 4.

In addition, the electrically insulating element 5 is made of high-temperature-resistant material, such as e.g. thermoplastic material of the polyamide type.

Appropriately, the wound component 1 comprises at least one second electrically insulating element 5b interposed between the temperature sensor 4 and the ferromagnetic support 2.

The second electrically insulating element 5b is preferably made of the same material as that used to make the first electrically insulating element 5a.

This way, the temperature sensor 4 is enclosed between two electrically insulating elements 5a, 5b, the first of which is arranged in contact with the winding 3, and the second of which is in contact with the ferromagnetic support 2.

Alternative embodiments cannot however be ruled out wherein there are a plurality of first and of second electrically insulating elements 5a, 5b so as to arrange a plurality of first insulating layers between the winding 3 and the temperature sensor 4 and a plurality of second insulating layers between the temperature sensor 4 and the ferromagnetic support 2.

In the embodiment shown in the figures, the ferromagnetic support 2 comprises at least a first supporting stretch 6 and at least a second supporting stretch 7 arranged substantially opposite to each other.

Advantageously, the winding 3 is wound around the first stretch 6.

The temperature sensor 4, on the other hand, is arranged between the winding 3 and at least one of the first stretch 6 and the second stretch 7.

Preferably, the ferromagnetic support 2 comprises a pair of second stretches 7 arranged opposite to each other and parallel to the first stretch 6, which is arranged centrally and equidistant from the second stretches 7.

Appropriately, the ferromagnetic support 2 comprises a pair of basic stretches 8 opposite and parallel to each other, with which the first stretch 6 and the second stretches 7 are orthogonally associated, so as to create a monolithic ferromagnetic support 2.

Preferably, the first stretch 6 is substantially cylindrical in shape so as to facilitate the arrangement of the winding 3 around the same first stretch.

The second stretches 7, on the other hand, are two internally curved walls having a radius of curvature substantially equal to that of the first stretch 6 so as to define together with the latter and together with the basic stretches 8 two openings 9, inside which the winding 3 is housed and wound around the first stretch 6.

In fact, according to the embodiment shown in the figures, the winding 3 is wound repeatedly around the first stretch 6, so as to make a solenoid, the layers of winding 3 of which extend evenly from the first stretch 6 to reach the second stretches 7, as shown in FIG. 3.

Conveniently, the winding 3 is arranged to occupy approximately all of the openings 9.

In particular, the wound component 1 made this way is preferably used as an inductance.

Advantageously, the temperature sensor 4 is arranged equidistant from the winding 3 and from at least one of the first stretch 6 and the second stretch 7.

In particular, the temperature sensor 4 is arranged in contact with the winding 3 and at least one of the first stretch 6 and the second stretch 7.

The temperature sensor 4 is preferably arranged between the winding 3 and the second supporting stretch 7.

In addition, the temperature sensor 4 is arranged inside one of the openings 9 substantially centered with respect to the second stretch 7, at one of the basic stretches 8.

This way, the temperature sensor 4 is moved away from the point at which the wound component 1 has the highest magnetic field strength, i.e. in the proximity of the first stretch 6.

For example, in a configuration wherein the temperature sensor 4 is arranged between the winding 3 and the first stretch 6, the intensity of the magnetic field acting on the temperature sensor 4 would be such as to interfere with the operation of the same, or could induce eddy currents inside the temperature sensor 4 that would distort the measurement of the temperature.

Appropriately, the first electrically insulating element 5a is interposed between the temperature sensor 4 and the second stretch 7.

Alternative embodiments of the wound component 1 cannot however be ruled out wherein the temperature sensor 4 is arranged between the first stretch 6 and the winding 3 and wherein the first electrically insulating element 5a is arranged between the first stretch 6 and the temperature sensor 4 and the second electrically insulating element 5b is arranged between the temperature sensor 4 and the winding 3.

In addition, alternative embodiments of the wound component 1 cannot be ruled out wherein the latter comprises one or more auxiliary electrically insulating elements 10 interposed between one or more of the layers of winding 3 of the winding 3.

In an alternative embodiment, the wound component is an electric power transformer comprising:
- at least one ferromagnetic support 2;
- at least one pair of electrically conductive windings 3 wound around the ferromagnetic support 2 and adapted to couple inductively with each other when an induction current runs through one of the windings 3;
- at least one temperature sensor 4 interposed between the ferromagnetic support 2 and the pair of windings 3.

In particular, this embodiment differs from the previous one in that it comprises a pair of windings 3 wound around the first stretch 6 in order to make a solenoid structure substantially equal to that described with reference to the preceding embodiment.

In addition, alternative embodiments of the transformer cannot be ruled out wherein there are more than two windings 3.

The present invention relates to a battery charger for electric or hybrid motor vehicles, comprising:
- at least one container body installable on a motor vehicle and defining at least one housing compartment;
- at least one electronic apparatus housed inside the housing compartment, connectable to at least one electric battery of the motor vehicle and configured to recharge the battery;

wherein the electronic apparatus comprises at least one wound component 1 and wherein the battery charger comprises temperature monitoring means for monitoring the temperature measured by the temperature sensor 4 which are operatively connected to the latter.

It has in practice been found that the described invention achieves the intended objects.

In particular, it is underlined that the use of the temperature sensor allows monitoring the temperature of the wound component or of the transformer in order to adjust the induction current according to the temperature value measured by the temperature sensor.

Moreover, the positioning of the temperature sensor between the winding and one of the second stretches allows measuring the temperature of the wound component or transformer, taking into account the temperature of the winding or windings and the ferromagnetic support in the same way.

The invention claimed is:

1. A wound component comprising:
   at least one ferromagnetic support comprising a first supporting stretch, a pair of second stretches arranged opposite to each other and parallel to the first stretch, which is arranged centrally and equidistant from the second stretches, and a pair of basic stretches opposite and parallel to each other, with which the first stretch and the second stretches are orthogonally associated, so as to create a monolithic ferromagnetic support;
   at least one electrically conductive winding wound around said first stretch of said ferromagnetic support and adapted to conduct at least one induction current; and
   at least one temperature sensor arranged between the winding and one of said second stretches, wherein
   said temperature sensor is arranged in contact with one of said basic stretches of said ferromagnetic support and with said winding, and
   said wound component comprises at least two electrically insulating elements interposed between said temperature sensor and said winding and between said temperature sensor and said ferromagnetic support.

2. The wound component according to claim 1, wherein said temperature sensor is of the type of a thermistor.

3. The wound component according to claim 1, wherein said temperature sensor is of the type of a Negative Temperature Coefficient (NTC) thermistor.

4. The wound component according to claim 1, wherein said temperature sensor is of the type of a Positive Temperature Coefficient (PTC) thermistor.

5. The wound component according to claim 1, wherein the wound component is an electric power transformer, wherein
   the at least one electrically conductive windings wound comprises at least one pair of electrically conductive windings wound around said ferromagnetic support and adapted to couple inductively with each other when an induction current runs through one of said pair of windings; and
   said at least one temperature sensor is interposed between said ferromagnetic support and said pair of windings.

6. A battery charger for electric or hybrid motor vehicles, the battery charger comprising:
   at least one container body installable on a motor vehicle and defining at least one housing compartment; and
   at least one electronic apparatus housed inside said housing compartment, connectable to at least one electric battery of said motor vehicle and configured to recharge said battery; wherein
   said electronic apparatus comprises at least one wound component according to claim 1, and
   said battery charger comprises temperature monitoring means for monitoring the temperature measured by said temperature sensor which are operatively connected to the temperature sensor.

* * * * *